(12) United States Patent
Yoshida et al.

(10) Patent No.: US 10,901,166 B2
(45) Date of Patent: Jan. 26, 2021

(54) LENS UNIT

(71) Applicant: TIANJIN OFILM OPTO ELECTRONICS CO., LTD., Tianjin (CN)

(72) Inventors: Daiki Yoshida, Saitama (JP); Kensuke Masui, Saitama (JP)

(73) Assignee: TIANJIN OFILM OPTO ELECTRONICS CO., LTD., Tianjin (CN)

( * ) Notice: Subject to any disclaimer, the term of this patent is extended or adjusted under 35 U.S.C. 154(b) by 183 days.

(21) Appl. No.: 16/089,230

(22) PCT Filed: Jan. 16, 2017

(86) PCT No.: PCT/JP2017/001282
§ 371 (c)(1),
(2) Date: Nov. 6, 2018

(87) PCT Pub. No.: WO2017/168960
PCT Pub. Date: Oct. 5, 2017

(65) Prior Publication Data
US 2019/0121049 A1    Apr. 25, 2019

(30) Foreign Application Priority Data

Mar. 29, 2016 (JP) ................................. 2016-065656

(51) Int. Cl.
*G02B 7/02* (2006.01)
*G03B 15/00* (2006.01)
(52) U.S. Cl.
CPC .............. *G02B 7/02* (2013.01); *G03B 15/00* (2013.01)

(58) Field of Classification Search
CPC .................................. G02B 7/02; G03B 15/00
(Continued)

(56) References Cited

U.S. PATENT DOCUMENTS

2006/0158748 A1  7/2006  Hirata et al.
2015/0131175 A1* 5/2015  Lamontagne .......... G02B 7/026
                                                                    359/830
2016/0025950 A1  1/2016  Lamontagne

FOREIGN PATENT DOCUMENTS

JP       55941312 U    3/1984
JP       H06300949 A  10/1994
(Continued)

OTHER PUBLICATIONS

Translation of International Search Report dated Mar. 21, 2017 in International Application No. PCT/JP2017/001282, 2 pages.
(Continued)

*Primary Examiner* — William Choi
(74) *Attorney, Agent, or Firm* — Hodgson Russ LLP (57) ABSTRACT

The present disclosure provides a lens unit including: a lens including a first circular shaped portion and a second circular shaped portion arranged in a row along an optical axis direction; and a lens-barrel formed of a resin and formed in a tubular shape, the lens-barrel including: a first inner peripheral face to which the first circular shaped portion is fitted, and a second inner peripheral face to which the second circular shaped portion is fitted and is positioned separated in the optical axis direction from a fitting section where the first circular shaped portion and the first inner peripheral face are fitted, the second circular shaped portion contacts with the second inner peripheral face at three or more portions in a circumferential direction.

12 Claims, 8 Drawing Sheets

(58) Field of Classification Search
USPC .......................................... 359/811, 819, 830
See application file for complete search history.

(56) References Cited

FOREIGN PATENT DOCUMENTS

| JP | 2006201378 A | 8/2006 |
|---|---|---|
| JP | 2009216774 A | 9/2009 |
| JP | 2011002576 A | 1/2011 |
| JP | 4847020 B2 | 12/2011 |
| JP | 201278610 A | 4/2012 |
| JP | 5406165 B2 | 2/2014 |
| WO | 2016011544 A1 | 1/2016 |

OTHER PUBLICATIONS

Written Opinion, dated Mar. 21, 2017, issued in International Application No. PCT/JP2017/001282, 10 pages in English and Japanese.
International Preliminary Report on Patentability, completed Mar. 7, 2018, in International Application No. PCT/JP2017/001282, 18 pages in English and Japanese.

* cited by examiner

FIG.8 ial shaped portion arranged in a row along an
LENS UNIT

This is a National Stage of International Application No. PCT/JP2017/001282 filed Jan. 16, 2017, claiming priority based on Japanese Patent Application No. 2016-065656 filed Mar. 29, 2016, each of which is incorporated herein by reference in its entirety.

TECHNICAL FIELD

The present disclosure relates to a lens unit.

BACKGROUND ART

Lens units having plural lenses made from plastic (resin) inserted into a lens-barrel made from plastic (resin) and having a polygonal shaped inner peripheral face are disclosed in Japanese Patent Publication Nos. 4847020 and 5406165. Configurations of a lens fitted into a lens-barrel having a circular shaped inner peripheral face when viewed from an optical axis direction, and contacting the lens-barrel at plural locations along the optical axis direction, are disclosed in Japanese Patent Application Laid-Open (JP-A) Nos. 2011-002576 and 2009-216774.

SUMMARY OF INVENTION

Technical Problem

Adopting a polygonal shaped inner peripheral face for a lens-barrel, such as in Japanese Patent Publication Nos. 4847020 and 5406165, decreases contact portions between the lens and the lens-barrel. On the one hand, this facilitates assembly, however, the lens therein is readily tilted in the optical axis direction. Although on the one hand a lens can be suppressed from tilting by making the lens contact the lens-barrel at plural locations in the optical axis direction as in JP-A Nos. 2011-002576 and 2009-216774, the resistance to inserting the lens is raised, and this decreases the ease of assembly.

The present disclosure provides a lens unit that may suppress lenses from tilting while securing ease of assembly in a configuration having a lens-barrel formed from a resin.

Solution to Problem

A first aspect of the present disclosure is a lens unit including: a lens including a first circular shaped portion and a second circular shaped portion arranged in a row along an optical axis direction; and a lens-barrel formed of a resin and formed in a tubular shape, the lens-barrel including: a first inner peripheral face to which the first circular shaped portion is fitted, and a second inner peripheral face to which the second circular shaped portion is fitted and is positioned separated in the optical axis direction from a fitting section where the first circular shaped portion and the first inner peripheral face are fitted, the second circular shaped portion contacts with the second inner peripheral face at three or more portions in a circumferential direction.

In the lens unit according to the first aspect of the present disclosure, the first circular shaped portion of the lens fits together with the first inner peripheral face of the lens-barrel. The second circular shaped portion of the lens fits together with the second inner peripheral face of the lens-barrel at a position separated in the optical axis direction from the fitting section where the first circular shaped portion and the first inner peripheral face fit together. Thus in the lens unit according to the first aspect, the lens contacts the inner peripheral face of the lens-barrel at plural locations when viewed from a direction orthogonal to the optical axis direction (a radial direction of the lens-barrel). This enables the lens to be suppressed from tilting compared to structures in which the lens only contacts an inner peripheral face of the lens-barrel at a single location when viewed from the radial direction of the lens-barrel.

Moreover, in the lens unit according to the first aspect, the second circular shaped portion makes contact with the second inner peripheral face at three or more locations in the circumferential direction and so positional precision of the lens is easily secured. This means that there is no need to lengthen the fitting length for each of the first circular shaped portion and the second circular shaped portion due to performing positioning of the lens at the second inner peripheral face. As a result, in the lens unit according to the first aspect, the lens may be suppressed from becoming difficult to insert into the lens-barrel when assembling the lens, enabling ease of assembly to be secured.

In a lens unit according to a second aspect of the present disclosure, in the lens unit according to the first aspect, the second inner peripheral face may be formed with a polygonal profile when viewed from the optical axis direction; and contact portions at the second inner peripheral face that contacts with the second circular shaped portion may have flat faces that forms each side of the polygonal profile.

In the lens unit according to the second aspect of the present disclosure, contact portions between the second circular shaped portion and the second inner peripheral face are point contacts when viewed from the optical axis direction due to the second inner peripheral face having a polygonal profile. Thus in the lens unit according to the second aspect the resistance is reduced during assembly compared to structures where the second circular shaped portion is received with a curved face extending around the entire periphery and there is face-to-face contact therebetween. This enables a fitting length to be lengthened while still maintaining ease of assembly. Note that reference here to a "polygonal profile" is broadly defined and includes any structure in which each of the sides of a polygonal profile is connected by a corner or by a circular arc. There is also no limitation to structures in which faces forming each side are flat faces.

In a lens unit according to a third aspect of the present disclosure, in the lens unit according to the second aspect, the second inner peripheral face may include curved faces formed to link adjacent of the flat faces together.

In the lens unit according to the third aspect of the present disclosure, due to the adjacent flat faces being linked together by the curved faces, stress that would act on the second inner peripheral face as in a structure in which flat faces are connected together by angled corners can be suppressed from being concentrated at angled corners. Namely, the lens unit according to the third aspect may disperse stress acting on the second inner peripheral face.

In a lens unit according to a fourth aspect of the present disclosure, in the lens unit according to the first aspect, a curved face may be formed at a contact portion at the second inner peripheral face where contact is made with the second circular shaped portion, the curved face being depressed toward a radial direction outside of the lens-barrel when viewed from the optical axis direction and making face-to-face contact with the second circular shaped portion.

In the lens unit according to the fourth aspect of the present disclosure, due to the second circular shaped portion being received by the curved face, the contact surface area with the second inner peripheral face can be made larger compared to configurations in which the second circular shaped portion is received by a point. As a result, in the lens unit according to the fourth aspect, a deterioration in optical characteristics, resulting from a misalignment in optical axis arising from distortion at the radial direction outside of the lens, may be suppressed from occurring.

In the lens unit according to a fifth aspect of the present disclosure, in the lens unit according to the third aspect or the fourth aspect, the first circular shaped portion and the first inner peripheral face may contact each other at three or more portions in a circumferential direction.

In the lens unit according to the fifth aspect of the present disclosure, the positional precision of the lens is easily secured, compared to structures in which the first circular shaped portion contacts the first inner peripheral face over an entire region in the circumferential direction.

In a lens unit according to a sixth aspect of the present disclosure, in the lens unit according to the fifth aspect, the first inner peripheral face may have a polygonal profile when viewed from the optical axis direction.

In the lens unit according to the sixth aspect of the present disclosure, due to the first inner peripheral face having a polygonal profile, the contact portions between the first circular shaped portion and the first inner peripheral face are point contacts. The lens unit according to the sixth aspect accordingly has reduced resistance during assembly compared to structures in which the first circular shaped portion is received by a curved face with face-to-face contact therebetween. This enables the fitting length to be lengthened while still maintaining ease of assembly.

In a lens unit according to a seventh aspect of the present disclosure, in the lens unit according to the sixth aspect, the first inner peripheral face may be configured including flat faces forming each side of the polygonal profile, and circular arc shaped connection portions connecting adjacent of the flat faces together.

In the lens unit according to the seventh aspect of the present disclosure, stress that would act on the first inner peripheral face as in a structure in which adjacent flat faces were connected together by angled corners can be suppressed from being concentrated at angled corners. Namely, the lens unit according to the seventh aspect is capable of dispersing stress acting on the first inner peripheral face.

In a lens unit according to an eighth aspect of the present disclosure, in the lens unit according to any one of the first aspect to the seventh aspect, the first inner peripheral face may be positioned further to a radial direction outside than the second inner peripheral face.

In the lens unit according to the eighth aspect of the present disclosure, mechanical processing on a mold for molding the lens-barrel is easy compared to structures in which the first inner peripheral face and the second inner peripheral face are formed at the same position as each other in the radial direction. Namely, due to there being a difference in radius between the first inner peripheral face and the second inner peripheral face, face cutting can be performed separately at the location on the mold corresponding to the first inner peripheral face and the location on the mold corresponding to the second inner peripheral face. Moreover, in cases in which the second inner peripheral face is positioned further to the radial direction outside than the first inner peripheral face, this would be an under-cut when removing the mold component (core pin) for molding this portion, resulting in resistance to demolding resulting in the component not being removable from the mold. Thus in the lens unit according to the eighth aspect, positioning the first inner peripheral face further to the radial direction outside than the second inner peripheral face enables a situation to be suppressed from arising in which the mold component is not removable.

In a lens unit according to a ninth aspect of the present disclosure, in the lens unit according to the eighth aspect, a length of the first circular shaped portion in the optical axis direction ma be shorter than a length of the second circular shaped portion in the optical axis direction.

In the lens unit according to the ninth aspect of the present disclosure, making the length in the optical axis direction shorter for the first circular shaped portion that has a larger diameter than the second circular shaped portion makes it easier to assemble the lens to the lens-barrel.

In a lens unit according to a tenth aspect of the present disclosure, in the lens unit according to the sixth aspect or the seventh aspect, the first inner peripheral face may be positioned further to a radial direction outside than the second inner peripheral face; and flat faces forming each side of the first inner peripheral face and flat faces forming each side of the second inner peripheral face may be formed at the same circumferential direction positions with each other, when viewed from the optical axis direction.

In the lens unit according to the tenth aspect of the present disclosure, due to the flat faces forming each side of the first inner peripheral face and flat faces forming each side of the second inner peripheral face being formed at the same circumferential direction positions as each other when viewed from the optical axis direction, the contact portions between the first circular shaped portion and the first inner peripheral face are aligned in the circumferential direction with the contact portions between the second circular shaped portion and the second inner peripheral face. Thus the lens unit according to the tenth aspect is able to effectively suppress the lens from tilting compared to structures in which the contact portions between the first circular shaped portion and the first inner peripheral face and the contact portions between the second circular shaped portion and the second inner peripheral face are at different positions in the circumferential direction.

In a lens unit according to an eleventh aspect of the present disclosure, in the lens unit according to any one of the first aspect to the ninth aspect, at least one of the first inner peripheral face or the second inner peripheral face may include an inclined face inclined with respect to the optical axis direction; and of the first circular shaped portion or the second circular shaped portion, a circular shaped portion that fits together with the inclined face may be inclined to correspond to the inclined face.

In the lens unit according to the eleventh aspect of the present disclosure, the inclined face guides the lens when the lens is being inserted and fitted into the lens-barrel. This makes fitting the lens at a specific position easy, compared to cases in which both the first inner peripheral face and the second inner peripheral face are formed along the optical axis direction.

In a lens unit according to a twelfth aspect of the present disclosure, in the lens unit according to any one out of the first aspect of the eleventh aspect, the lens unit may be a lens unit employed onboard a vehicle or employed for surveillance.

In a lens unit according to a twelfth aspect of the present disclosure, deterioration in performance may be reduced even for a lens unit employed in an environment in which there is a possibility of being exposed to high temperatures and it is difficult to maintain image forming performance, such as in a surveillance camera or an onboard camera.

Advantageous Effects

The above aspects of the present disclosure enable a lens unit to be provided that is capable of suppressing a lens from tilting while still securing ease of assembly in a configuration having a lens-barrel formed from a resin.

DESCRIPTION OF EMBODIMENTS

A description follows regarding exemplary embodiments according to the present disclosure, with reference to the drawings. Note that in the drawings the same reference numerals are denoted to configuration elements having the same function, and explanation is omitted thereof as appropriate. Moreover, S is employed as appropriate in each of the drawings to indicate an optical axis, and a direction along the optical axis S is referred to as the optical axis direction.

Figure 1:
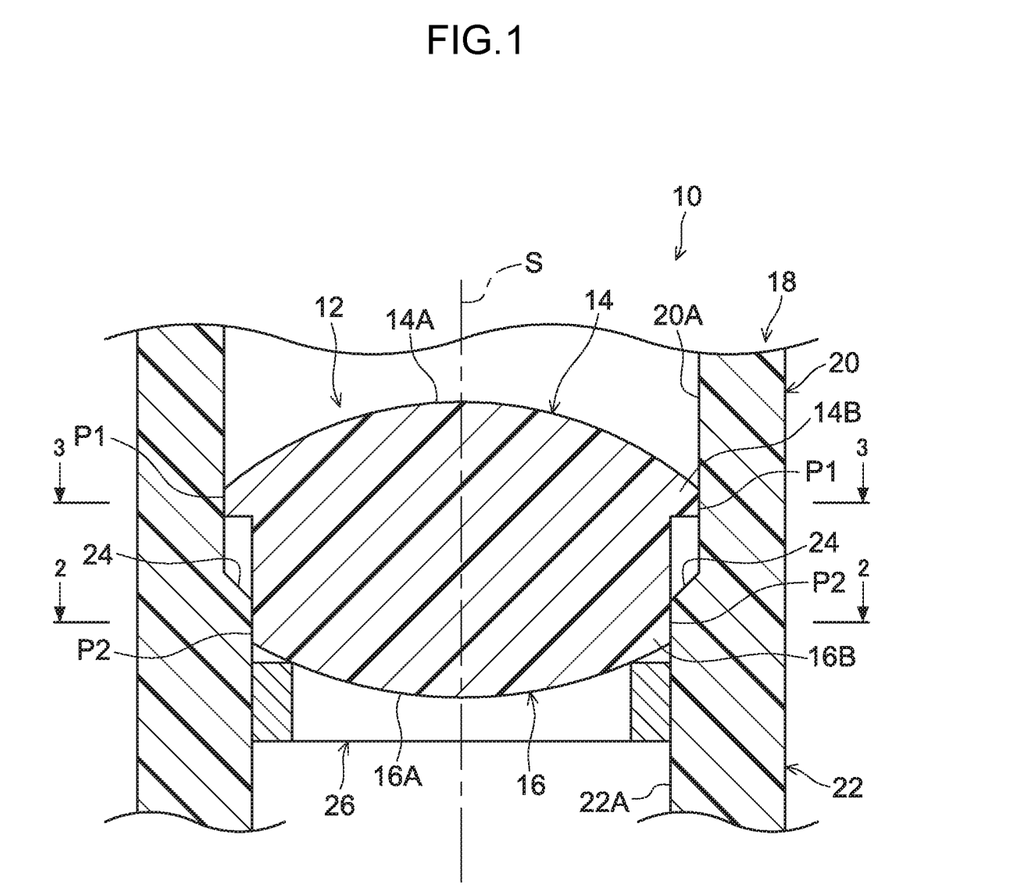
FIG. 1 is a cross-section illustrating relevant portions of a lens unit according to an exemplary embodiment, as viewed along a radial direction.

As illustrated in FIG. 1, a lens unit 10 according to the present exemplary embodiment is configured including a lens 12 made from resin or made from glass, and a lens-barrel 18 made from resin and housing the lens 12. Note that plural lenses separate from the lens 12 are also housed in the lens-barrel 18 so as to configure an optical system. Moreover, the upper side in FIG. 1 is an object side, and the lower side in FIG. 1 is an imaging side.

Lens Configuration

The lens 12 is formed in a substantially circular shape when viewed from the optical axis direction, and includes a first circular shaped portion 14 and a second circular shaped portion 16 arranged in a row along the optical axis direction. As an example, the lens 12 of the present exemplary embodiment is formed with an external diameter not exceeding 15 mm. The first circular shaped portion 14 is positioned at the object side of the lens 12 and includes a first lens section 14A including an optical surface, and a first peripheral edge section 14B configuring a section at an outer periphery of the first lens section 14A. Further, The face on the object side of the first circular shaped portion 14 is curved so as to be convex on the object side.

On the other hand, The second circular shaped portion 16 is positioned on the imaging side of the lens 12 and is integrally formed to the first circular shaped portion 14. The second circular shaped portion 16 includes a second lens section 16A including an optical surface, and a second peripheral edge section 16B configuring a section at an outer periphery of the second lens section 16A. Further, a face on the imaging side of the second circular shaped portion 16 is curved so as to be convex on the imaging side.

Here, the first circular shaped portion 14 is formed with a larger diameter than the second circular shaped portion 16. Accordingly, the first peripheral edge section 14B of the first circular shaped portion 14 is positioned further toward the radial direction outside than the second peripheral edge section 16B of the second circular shaped portion 16. Further, the optical axis direction length of the first circular shaped portion 14 is shorter than the optical axis direction length of the second circular shaped portion 16. Furthermore, the first peripheral edge section 14B of the first circular shaped portion 14 and the second peripheral edge section 16B of the second circular shaped portion 16 respectively fit together with an inner peripheral face of the lens-barrel 18.

Lens-Barrel Configuration

The lens-barrel 18 is open at both optical axis direction ends thereof, is formed in a substantially circular cylinder shape, and is formed by resin molding. Further, a holding portion (not illustrated in the drawings) is provided at the imaging side end of the lens-barrel 18. A through hole that functions as an optical aperture is formed in this holding portion. Furthermore, a crimped portion (not illustrated in the drawings) is formed by heat crimping the object side end of the lens-barrel 18. Components of the optical system are suppressed from coming out from the lens-barrel 18 by this crimped portion.

The lens-barrel 18 may, for example, be configured by a polyphenylene sulfide containing glass fibers and an inorganic filler. The mechanical strength is raised by making the lens-barrel 18 from a fiber reinforced plastic containing glass fibers or the like. Examples of resins that may be employed therefor include at least one type of resin selected from the group consisting of a polyamide, a polyacetal, a polycarbonate, a polyphenylene ether, a polybutylene terephthalate, a polyethylene terephthalate, a polyethylene, a syndiotactic polystyrene, a polysulfone, a polyethersulfphone, a polyphenylene sulfide, a polyarylate, a polyamide-imide, a polyetherimide, a polyetheretherketone, an acrylonitrile butadiene styrene, a polyolefin, and a modified polymer of any of these resins. The resin may also be a polymer alloy containing at least one resin selected from this group. Fibers that may be employed include glass fibers and carbon fibers, and a fiber reinforced plastic including an inorganic filler or the like may be employed.

Moreover, the above resin materials such as fiber reinforced plastic may contain glass fibers, carbon fibers, inorganic fillers, or the like as required. Making the lens-barrel from a fiber reinforced plastic containing glass fibers or the like enables a lens-barrel with a higher mechanical strength to be obtained.

Note that the lens-barrel 18 needs to have high light-blocking properties and light-absorbing properties. The resin employed therefor is preferably black in color, and the above resin material preferably contains a black pigment or black colorant. Configuring the lens-barrel 18 from a resin material containing a black pigment or black colorant enables the inner wall face of the lens-barrel 18 to be made black in color, thereby enabling more effective suppression of visible light from being reflected at the inner wall face of the lens-barrel 18.

The lens-barrel 18 is configured including a first step portion 20 and a second step portion 22, in this sequence from the object side. The first step portion 20 extends with a fixed thickness along the optical axis direction. The inner peripheral face of the first step portion 20 configures a first inner peripheral face 20A that the first circular shaped portion 14 fits together with. On the other hand, the second step portion 22 extends with a fixed thickness along the optical axis direction. The inner peripheral face of the second step portion 22 configures a second inner peripheral face 22A that the second circular shaped portion 16 fits together with at a position separated in the optical axis direction from the fitting section where the first circular shaped portion 14 and the first inner peripheral face 20A fit together.

A step 24 is formed to the inner peripheral face of the lens-barrel 18 at a boundary portion between the first step portion 20 and the second step portion 22. The step 24 is inclined toward the radial direction inside on progression from the object side toward the imaging side. Accordingly, the first inner peripheral face 20A is positioned further to the radial direction outside than the second inner peripheral face 22A.

Figure 3:
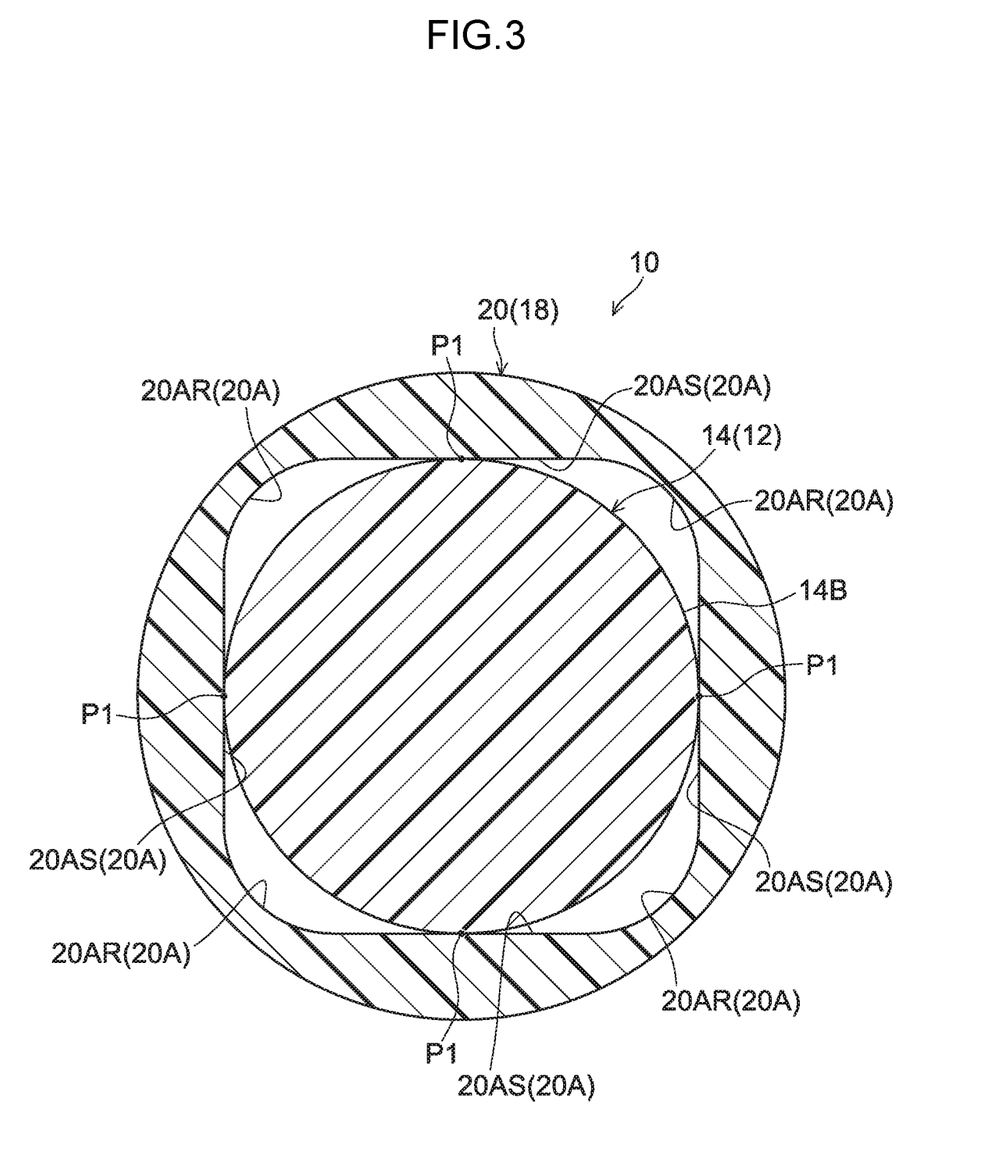
FIG. 3 is an enlarged cross-section sectioned along line 3-3 of FIG. 1.

As illustrated in FIG. 3, the first inner peripheral face 20A is formed with a polygonal profile when viewed from the optical axis direction, and, as an example in the present exemplary embodiment, is formed with a substantially square shaped profile when viewed from the optical axis direction. Further, the first inner peripheral face 20A is configured including four flat faces 20AS that form each side of a square, and substantially circular arc shaped connecting portions 20AR that connect adjacent of the flat faces 20AS together. Thus, the first circular shaped portion 14 contacts each of the four flat faces 20AS, and contact portions P1 are configured at locations where the first circular shaped portion 14 and the flat faces 20AS make contact with each other. Namely, the first circular shaped portion 14 makes contact with the first inner peripheral face 20A at four locations (three or more locations) in the circumferential direction.

Figure 2:
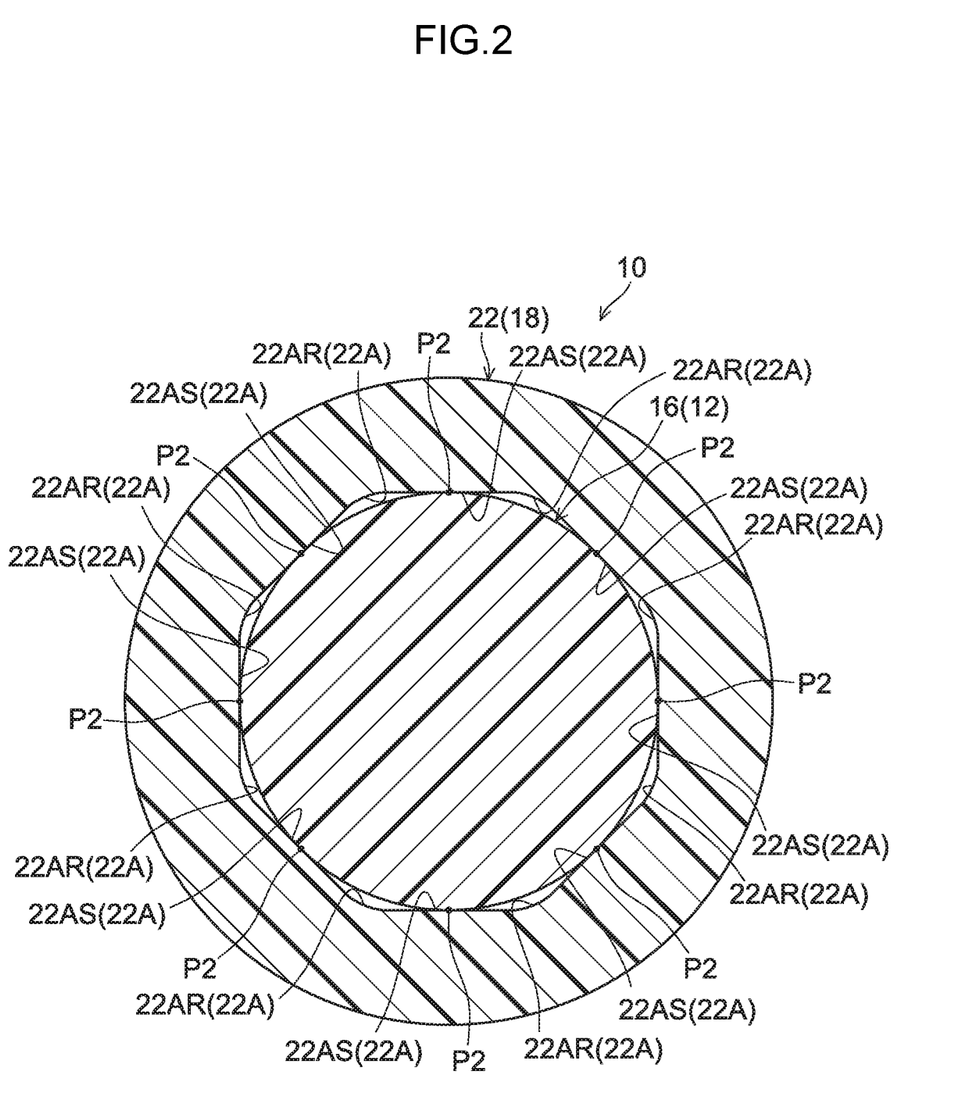
FIG. 2 is an enlarged cross-section sectioned along line 2-2 of FIG. 1.

As illustrated in FIG. 2, the second inner peripheral face 22A is formed with a polygonal profile when viewed from the optical axis direction, and, as an example in the present exemplary embodiment, is formed with a substantially regular hexagonal shaped profile when viewed from the optical axis direction. Further, the second inner peripheral face 22A is configured including eight flat faces 22AS that form each side of a regular hexagon, and substantially circular arc shaped connecting portions 22AR that connect adjacent of the flat faces 22AS together. Furthermore, The second circular shaped portion 16 contacts each of the eight flat faces 22AS, and contact portions P2 are configured at locations where the second circular shaped portion 16 and the flat faces 22AS make contact with each other. Namely, the second circular shaped portion 16 makes contact with the second inner peripheral face 22A at eight locations (three or more locations) in the circumferential direction. FIG. 2 and FIG. 3 are illustrated with the same orientation as each other. Thus, the four flat faces 22AS at the top, bottom, left and right in FIG. 2 are formed at the same positions in the circumferential direction when viewed from the optical axis direction as the four flat faces 20AS in FIG. 3. Here, Reference to the "same positions in the circumferential direction" means that the contact portions between the circular shaped portions and the inner peripheral faces are positions aligned with each other in the circumferential direction.

As illustrated in FIG. 1, an optical axis direction length (fitting length) of the contact portions P1 between the first circular shaped portion 14 of the lens 12 and the first inner peripheral face 20A is shorter than an optical axis direction length of the contact portions P2 between the second circular shaped portion 16 and the second inner peripheral face 22A.

A spacing ring 26 is disposed at the object side of the lens 12. The spacing ring 26 is formed with a substantially ring shaped profile and fits together with the second inner peripheral face 22A of the lens-barrel 18. Further, an upper end portion of the spacing ring 26 contacts the second circular shaped portion 16 of the lens 12 at a lower face of the second peripheral edge section 16B so as to support the lens 12 from the object side.

Operation and Effects

Explanation follows regarding the operation and effects of the present exemplary embodiment.

In the present exemplary embodiment the first circular shaped portion 14 of the lens 12 fits together with the first inner peripheral face 20A of the lens-barrel 18, and the second circular shaped portion 16 of the lens 12 fits together with the second inner peripheral face 22A of the lens-barrel 18. Thereby, in the present exemplary embodiment, the lens 12 makes contact with the inner peripheral face of the lens-barrel 18 at plural locations when viewed from a direction orthogonal to the optical axis direction (a radial direction of the lens-barrel 18). Thus, in the present exemplary embodiment, the lens 12 can be suppressed from tilting compared to structures in which a lens only makes contact with the inner peripheral face of the lens-barrel 18 at a single location when viewed from the radial direction of the lens-barrel 18. For example, consider a structure of a comparative example in which the lens 12 only makes contacts at the second inner peripheral face 22A. In such cases, there is a gap between the first circular shaped portion 14 of the lens 12 and the first inner peripheral face 20A of the lens-barrel 18. The object side of the lens 12 is accordingly not supported by the lens-barrel 18, and so tilting readily occurs.

Moreover, in the present exemplary embodiment, the lens 12 is caused to contact the inner peripheral face of the lens-barrel 18 at plural locations (the first inner peripheral face 20A and the second inner peripheral face 22A), when viewed from a radial direction of the lens-barrel 18. Accordingly, in the present exemplary embodiment, there is no need to lengthen the respective fitting lengths of the first circular shaped portion 14 and the second circular shaped portion 16. Namely, in the present exemplary embodiment, the lens 12 can be suppressed from tilting even with the comparatively short contact portions P1 between the first circular shaped portion 14 and the first inner peripheral face 20A and the comparatively short contact portions P2 between the second circular shaped portion 16 and the second inner peripheral face 22A. As a result, in the present exemplary embodiment, the lens 12 can be suppressed from becoming difficult to insert into the lens-barrel 18 when assembling the lens 12 to the lens-barrel 18, enabling ease of assembly to be secured.

Further, in the present exemplary embodiment, the first circular shaped portion 14 makes contact with the first inner peripheral face 20A at three or more locations in the circumferential direction, and the second circular shaped portion 16 fits together with the second inner peripheral face 22A at three or more locations in the circumferential direction. Accordingly, the positional precision of the lens 12 is easily secured in the present exemplary embodiment, and there is no need to lengthen the respective fitting lengths at the first circular shaped portion 14 and the second circular shaped portion 16 due to performing positioning of the lens 12 with at least one out of the first inner peripheral face 20A or the second inner peripheral face 22A. As a result, in the present exemplary embodiment, the lens 12 can be suppressed from becoming difficult to insert into the lens-barrel 18 when assembling the lens 12, enabling ease of assembly to be secured.

Moreover, in the present exemplary embodiment, the optical axis direction length of larger diameter first circular shaped portion 14 is shorter than that of the second circular shaped portion 16. Thus, in the present exemplary embodiment, insertion of the lens 12 into the lens-barrel is easy compared to cases in which the larger diameter first circular shaped portion 14 is longer in the optical axis direction. Moreover, the fitting length at the contact portions P1 is shorter than the fitting length at the contact portions P2. Thus, in the present exemplary embodiment, by making the optical axis direction length of the contact portions P1 between the first circular shaped portion 14 and the first inner peripheral face 20A shorter in this manner, the lens 12 can be more easily inserted into the lens-barrel 18. Namely, the present exemplary embodiment enables the ease of assembly of the lens 12 to be raised.

Furthermore, in the present exemplary embodiment, the contact portions P2 between the second circular shaped portion 16 and the second inner peripheral face 22A configure point contacts due to the polygonal profile of the second inner peripheral face 22A. Thus, in the present exemplary embodiment, the resistance during assembly is reduced compared to structures having face-to-face contact in which the second circular shaped portion 16 is received by a curved face, such as a structure in which the second inner peripheral face 22A is given a circular shaped profile when viewed from the optical axis direction. This enables the fitting length to be lengthened while still maintaining ease of assembly. In particular, in the present exemplary embodiment, the second inner peripheral face 22A is configured including the flat faces 22AS that form each side of a polygonal shape, and the circular arc shaped connecting portions 22AR that connect adjacent of the flat faces 22AS together. Thus, in the present exemplary embodiment, portions corresponding to the circular arc shaped connecting portions 22AR can act as escape portions for an end mill when using a cutting tool such as an end mill to cut the faces of a mold.

Furthermore, in the present exemplary embodiment, the first inner peripheral face 20A also has a polygonal profile, similarly to the second inner peripheral face 22A. Thus, in the present exemplary embodiment, the contact portions between the first circular shaped portion 14 and the first inner peripheral face 20A also configure point contacts. This reduces the resistance during assembly compared to structures with face-to-face contact by receiving the first circular shaped portion 14 with a curved face. This enables the fitting length to be lengthened while still maintaining ease of assembly. In particular, in the present exemplary embodiment, the second inner peripheral face 22A is configured including the flat faces 20AS that form each side of a polygonal shape, and the circular arc shaped connecting portions 20AR that connect adjacent of the flat faces 20AS together. Thus in the present exemplary embodiment, portions corresponding to the circular arc shaped connecting portions 20AR can act as escape portions for an end mill when using a cutting tool such as an end mill to cut faces on a mold.

Moreover, in the present exemplary embodiment, the first inner peripheral face 20A is positioned further to the radial direction outside than the second inner peripheral face 22A. In this manner, the present exemplary embodiment enables easier processing for the lens-barrel 18 than structures in which the first inner peripheral face 20A and the second inner peripheral face 22A are formed at the same radial direction positions to each other, namely structures in which the first inner peripheral face 20A and the second inner peripheral face 22A have the same diameter as each other. Namely, as long as the position of the first inner peripheral face 20A is further to the radial direction outside than the second inner peripheral face 22A, face cutting can be performed separately at the locations on a mold corresponding to the first inner peripheral face 20A and the locations on the mold corresponding to the second inner peripheral face 22A.

Figure 4:
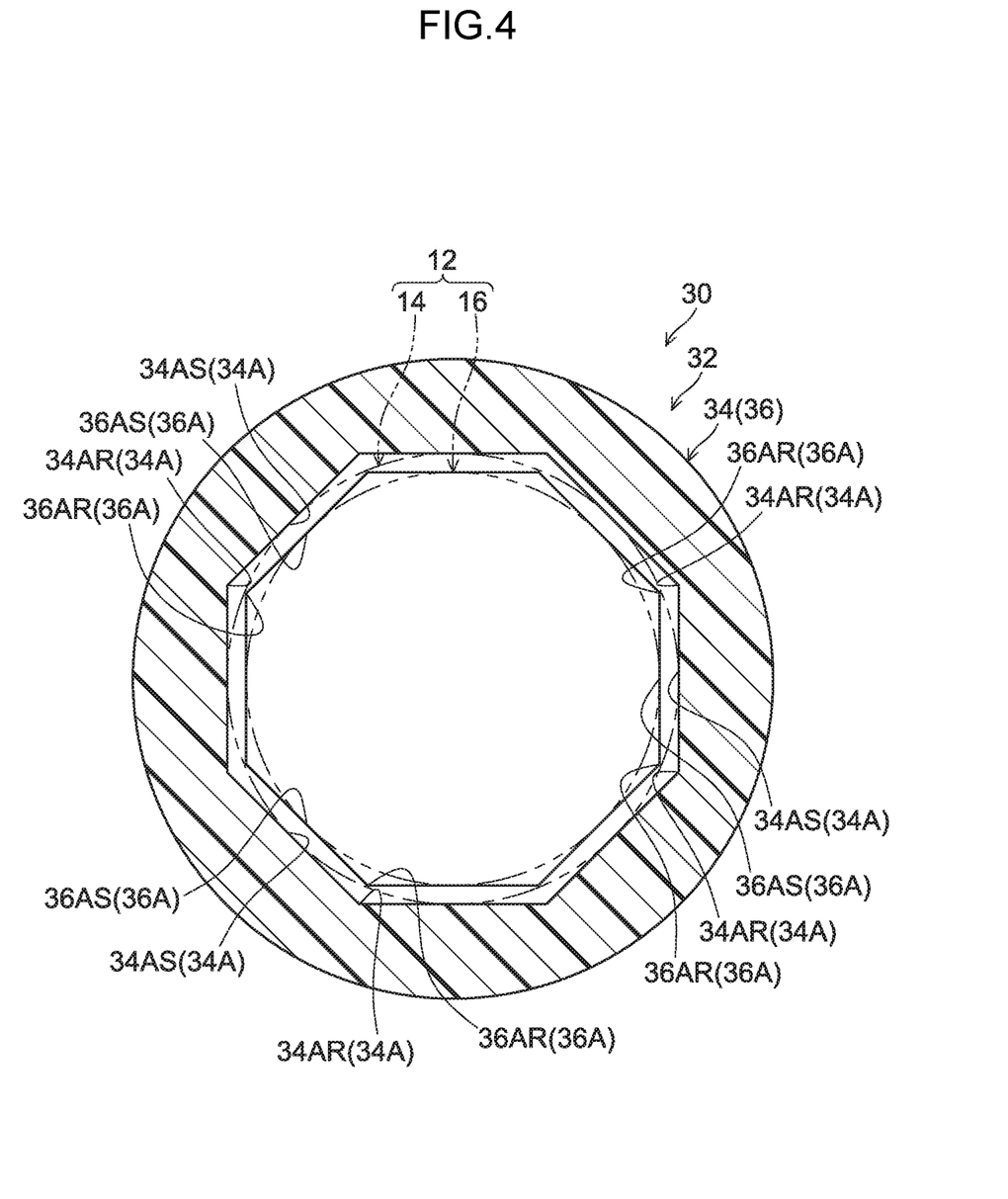
FIG. 4 is a cross-section of a lens-barrel illustrating a first modified example of a lens unit according to an exemplary embodiment.

An exemplary embodiment has been described above, however, as another modified example, flat faces 34AS configuring a first inner peripheral face 34A and flat faces 36AS configuring a second inner peripheral face 36A may be formed in the same circumferential direction positions to each other, such as in a first modified example illustrated in FIG. 4. Moreover, different profiles may be employed for the profile of the inner peripheral face of the lens-barrel, such as in a second modified example illustrated in FIG. 5, a third modified example illustrated in FIG. 6, a third modified example illustrated in FIG. 7, and a fourth modified example illustrated in FIG. 8. Note that, in the following description of the modified examples, the same reference numerals are denoted to configuration similar to that of the exemplary embodiment, and explanation thereof will be omitted as appropriate.

First Modified Example

As illustrated in FIG. 4, a lens-barrel 32 configuring a lens unit 30 according to the first modified example is configured including a first step portion 34 and a second step portion 36, in this sequence from the object side. The first step portion 34 extends with a fixed thickness along the optical axis direction. The inner peripheral face of the first step portion 34 configures a first inner peripheral face 34A that the first circular shaped portion 14 fits together with. The second step portion 36 extends with a fixed thickness along the optical axis direction. The inner peripheral face of the second step portion 36 configures a second inner peripheral face 36A that the second circular shaped portion 16 fits together with. Note that, for ease of explanation, the lens 12 is illustrated by dashed lines in FIG. 4, with both inner peripheral faces of the first inner peripheral face 34A and the second inner peripheral face 36A further toward the imaging side thereof (into the page in the drawing) are illustrated.

The first inner peripheral face 34A is positioned further to the radial direction outside than the second inner peripheral face 36A. Further, the first inner peripheral face 34A and the second inner peripheral face 36A both have polygonal profiles and, in the present modified example, are formed with substantially regular octagonal profiles when viewed from the optical axis direction. More specifically, the first inner peripheral face 34A is configured including eight flat faces 34AS that form each side of a regular hexagon, and connecting portions 34AR that connect adjacent of the flat faces 34AS together. Furthermore, the first circular shaped portion 14 of the lens 12 makes contact with the first inner peripheral face 34A at eight locations (three or more locations) along the circumferential direction.

On the other hand, the second inner peripheral face 36A is configured including eight flat faces 36AS that form each side of a regular hexagon, and connecting portions 36AR that connect adjacent of the flat faces 36AS together. Further, the second circular shaped portion 16 of the lens 12 makes contact with the second inner peripheral face 36A at eight locations (three or more locations) along the circumferential direction. Accordingly, as viewed from the optical axis direction, the flat faces 36AS of the first inner peripheral face 34A and the flat faces 36AS of the second inner peripheral face 36A are formed at the same respective positions as each other in the circumferential direction.

According to the present modified example, as viewed from the optical axis direction, the flat faces 34AS forming each side of the first inner peripheral face 34A and the flat faces 36AS forming each side of the second inner peripheral face 36A are at the same respective positions as each other in the circumferential direction. This means that the contact portions between the first circular shaped portion 14 and the first inner peripheral face 34A are aligned in the circumferential direction with the contact portions between the second circular shaped portion 16 and the second inner peripheral face 36A. Thus in, the present modified example, the lens can be effectively suppressed from tilting. Other effects are similar to those of the exemplary embodiment above.

Second Modified Example

Figure 5:
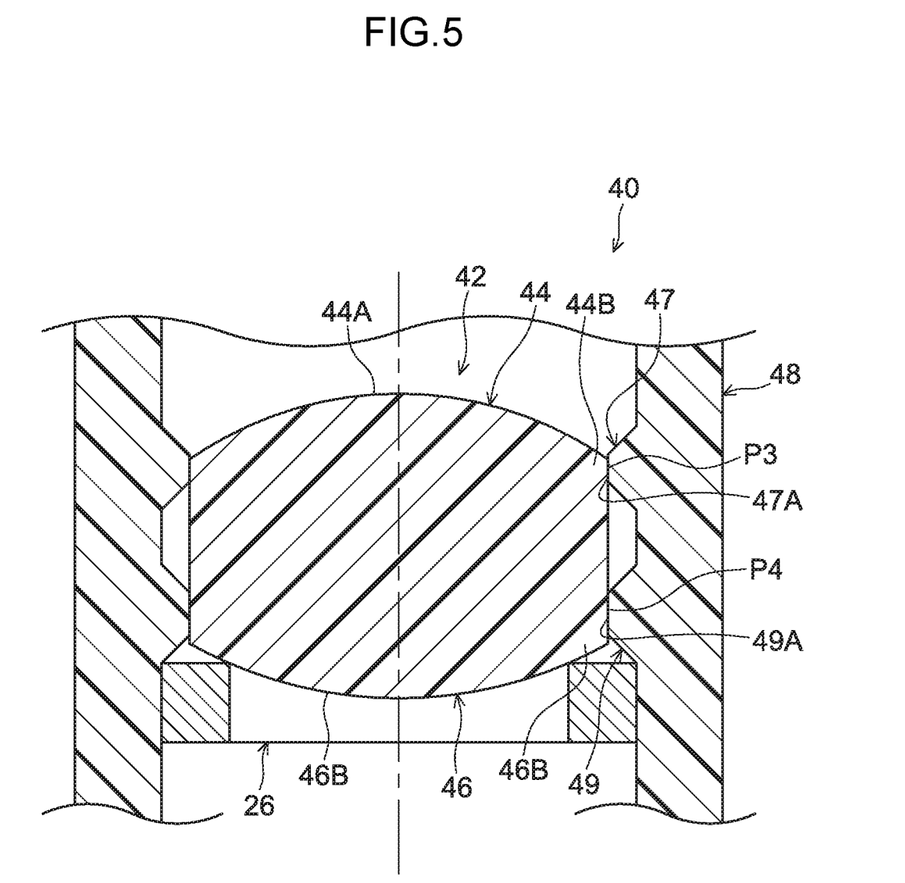
FIG. 5 is a cross-section corresponding to FIG. 1 and illustrating a second modified example of a lens unit according to an exemplary embodiment.

As illustrated in FIG. 5, a lens unit 40 according to a second modified example is configured including a lens 42 made from resin or made from glass, and a lens-barrel 48 made from resin and housing the lens 42. Further, the lens 42 is formed in a substantially circular shape when viewed from the optical axis direction, and includes a first circular shaped portion 44 and a second circular shaped portion 46 arranged in a row along the optical axis direction. The first circular shaped portion 44 is positioned at the object side of the lens 42 and includes a first lens section 44A including an optical surface, and a first peripheral edge section 44B configuring a section at an outer periphery of the first lens section 44A. A face at the object side of the first circular shaped portion 44 is curved so as to be convex on the object side.

The second circular shaped portion 46 is positioned at the imaging side of the lens 42, and is integrally formed to the first circular shaped portion 44. The second circular shaped portion 46 includes a second lens section 46A including an optical surface and a second peripheral edge section 46B configuring a section at the outer periphery of the second lens section 46A. The face at the imaging side of the second circular shaped portion 46 is curved so as to be convex on the imaging side. The first circular shaped portion 44 and the second circular shaped portion 46 have the same external diameters as each other.

The lens-barrel 48 so extends with a fixed thickness along the optical axis direction, with a protrusion portion 47 and a protrusion portion 49 formed at two locations on the inner peripheral face of the lens-barrel 48 so as to protrude toward the inside. The protrusion portion 47 is positioned at the object side, and a first inner peripheral face 47A that the first circular shaped portion 44 fits together with is configured by the protrusion portion 47. On the other hand, the protrusion portion 49 is positioned at the object side, and a second inner peripheral face 49A that the second circular shaped portion 46 fits together with at three or more circumferential direction locations is configured by the protrusion portion 49. Further, a fitting length of contact portions P3 between the first circular shaped portion 44 and the first inner peripheral face 47A is formed shorter than a fitting length of contact portions P4 between the second circular shaped portion 46 and the second inner peripheral face 49A. Note that, in the present modified example, the first circular shaped portion 44 and the second circular shaped portion 46 are locations defined by a relationship to the lens-barrel 48. The location on the lens 42 where contact is made with the first inner peripheral face 47A configures the first circular shaped portion 44, and the location on the lens 42 where contact is made with the second inner peripheral face 49A configures the second circular shaped portion 46.

In the present modified example, the first circular shaped portion 44 of the lens 42 fits together with the first inner peripheral face 47A of the lens-barrel 48, and the second circular shaped portion 46 of the lens 42 fits together with the second inner peripheral face 49A of the lens-barrel 48. Accordingly, in the present modified example, the lens 42 makes contact with the inner peripheral face of the lens-barrel 48 at plural locations when viewed from a direction orthogonal to the optical axis direction (a radial direction of the lens-barrel 48). Thus, in the present modified example, the lens 42 can be suppressed from tilting in comparison to structures in which a lens only makes contact with the inner peripheral face of the lens-barrel 48 at a single location when viewed from the radial direction of the lens-barrel 48.

Further, due to the lens 42 being fitted together with the inner peripheral face of the lens-barrel 48 at plural locations (the first inner peripheral face 47A and the second inner peripheral face 49A), when viewed from the radial direction of the lens-barrel 48, there is no need to lengthen the length along the optical axis direction of the respective contact portions of the first circular shaped portion 44 and the second circular shaped portion 46. Namely, in the present modified example, the lens 42 can be suppressed from tilting even though the contact portions P1 and the contact portions P2 are comparatively short. As a result, in the present modified example, the lens 42 can be suppressed from becoming difficult to insert when assembling the lens 42 to the lens-barrel 48, enabling ease of assembly to be secured.

Furthermore, in the present modified example, the second circular shaped portion 46 makes contact with the second inner peripheral face 49A at three or more locations in the circumferential direction, making it easy to secure the positioning precision of the lens 42. Due to performing positioning of the lens 12 with the second inner peripheral face 49A, there is no need to lengthen the respective fitting lengths of the first circular shaped portion 44 and the first circular shaped portion 14. As a result, in the present modified example, the lens 42 can be suppressed from becoming difficult to insert into the lens-barrel 48 when assembling the lens 42 to the lens-barrel 48, enabling ease of assembly to be secured.

Third Modified Example

Figure 6:
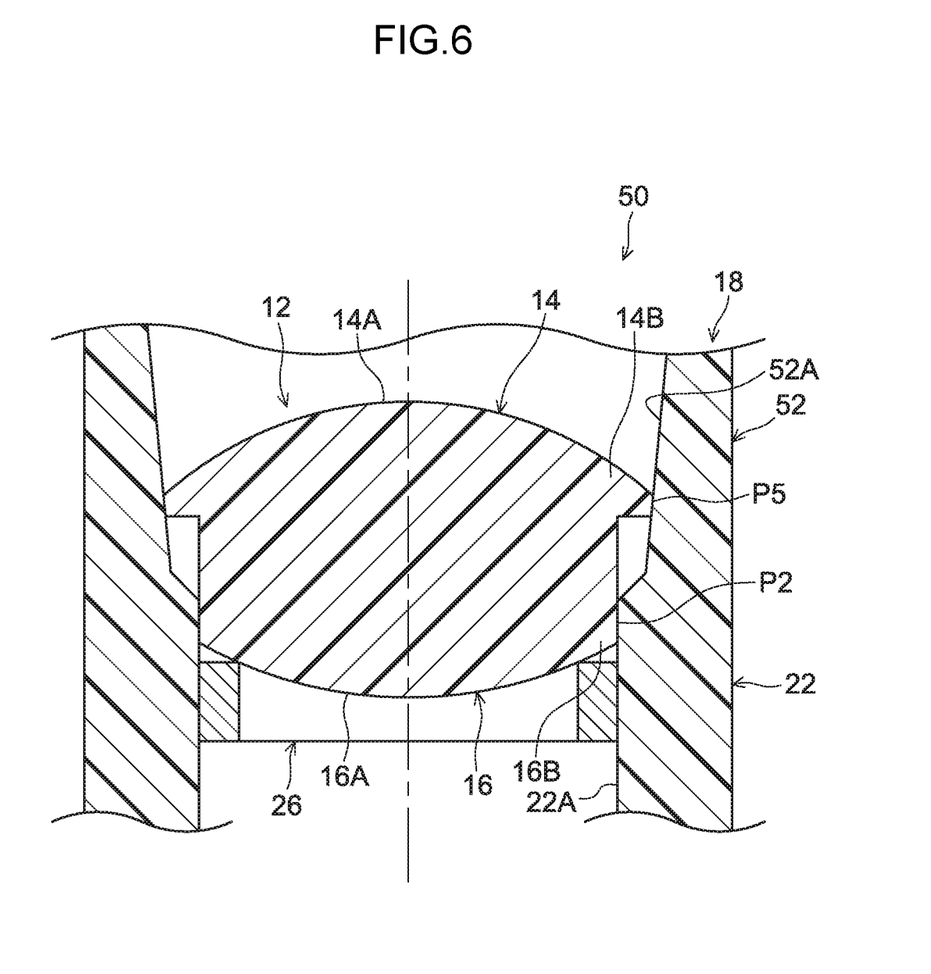
FIG. 6 is a cross-section corresponding to FIG. 1 and illustrating a third modified example of a lens unit according to an exemplary embodiment.

As illustrated in FIG. 6, a lens-barrel 18 configuring a lens unit 50 according to a third modified example is configured including a first step portion 52 and a second step portion 22. The second step portion 22 is configured similarly to in the exemplary embodiment, and a second circular shaped portion 16 of the lens 12 is fitted together with a second inner peripheral face 22A of the second step portion 22.

The inner peripheral face of the first step portion 52 is configured by an inclined face that is inclined to the optical axis direction. More specifically, the inner peripheral face of the first step portion 52 is formed with a polygonal profile when viewed from the optical axis direction, and each of the inner peripheral faces configuring this polygonal profile is an inclined face inclined toward the radial direction inside on progression from the object side toward the imaging side. These inclined faces configure a first inner peripheral face 52A which the first circular shaped portion 14 of the lens 12 fits together with. The peripheral face of the first peripheral edge section 14B of the first circular shaped portion 14 is fitted together with the first inner peripheral face 52A and inclined to correspond to the inclination of the first inner peripheral face 52A.

In the present modified example, the first inner peripheral face 52A, which is an inclined face, guides the lens 12 when the lens 12 is being inserted from the object side into the lens-barrel 18 and fitted therein. Thus in the present modified example, positioning of the lens 12 is performed easily compared to cases in which both the first inner peripheral face 52A and the second inner peripheral face 22A are formed along the optical axis direction.

Note that although in the present modified example it is only the first inner peripheral face 52A that is configured by an inclined face, there is no limitation thereto. For example, a configuration may be adopted in which it is only the second inner peripheral face 22A that is configured by an inclined face. In such cases, on the second peripheral edge section 16B of the second circular shaped portion 16 that fits together with the second inner peripheral face 22A, a peripheral face thereon that fits together with the second inner peripheral face 22A is inclined to correspond to the inclination of the second inner peripheral face 22A. Moreover, a configuration may be adopted in which both the first inner peripheral face 52A and the second inner peripheral face 22A are inclined faces.

Fourth Modified Example

Figure 7:
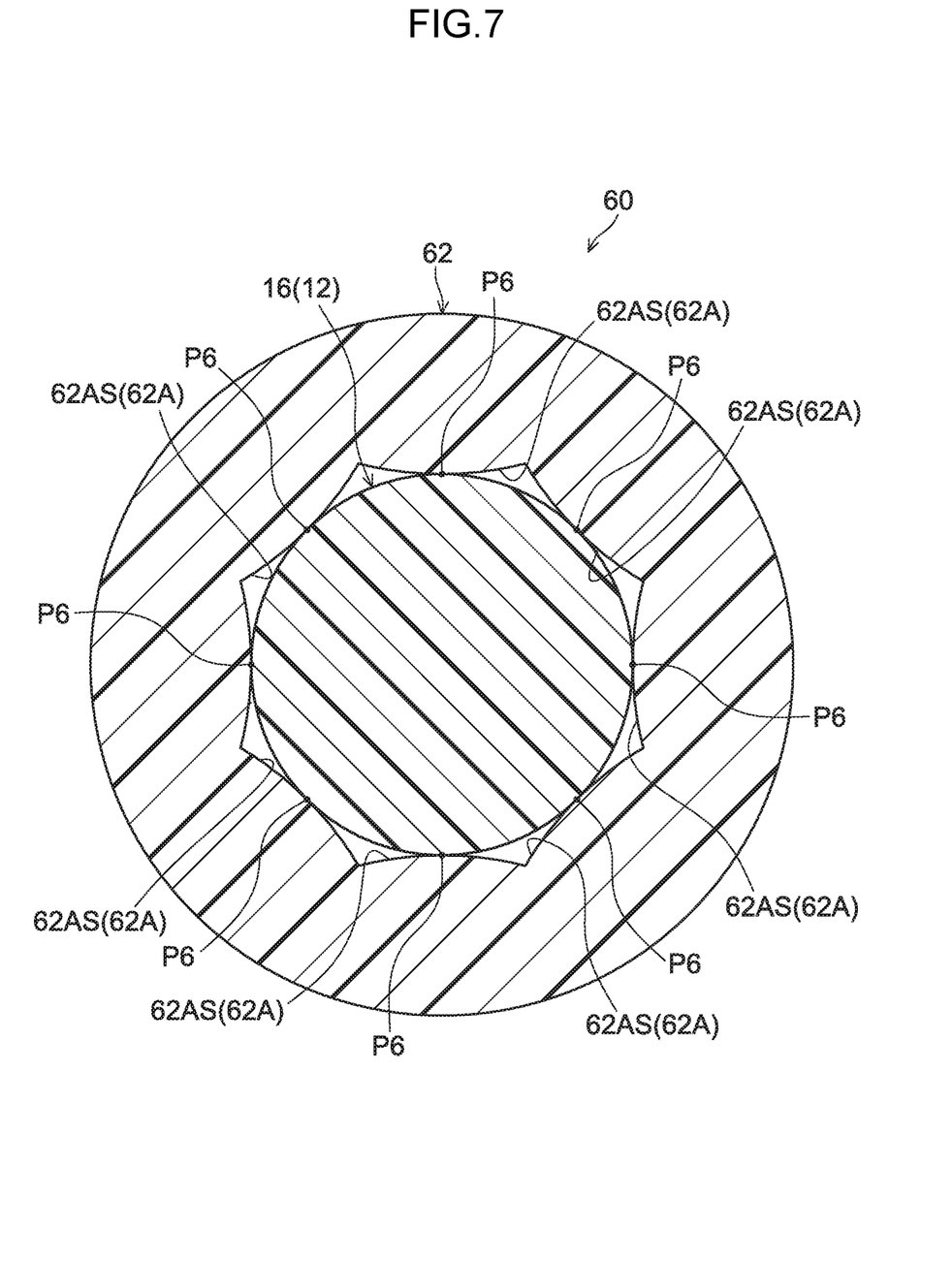
FIG. 7 is a cross-section corresponding to FIG. 2 and illustrating a fourth modified example of a lens unit according to an exemplary embodiment.

As illustrated in FIG. 7, a second inner peripheral face 62A of a lens-barrel 62 configuring a lens unit 60 according to a fourth modified example has a polygonal profile when viewed from the optical axis direction. However, instead of each side of the polygonal profile being a flat face, the second inner peripheral face 62A is configured by eight curved faces 62AS. The respective curved faces 62AS are each curved so as to be convex on the radial direction inside, and adjacent of the curved faces 62AS are connected together by angled corners. The respective curved faces 62AS fit together with the second circular shaped portion 16 of the lens 12, and contact portions P6 are configured at locations where the curved faces 62AS and the second circular shaped portion 16 contact each other. A first inner peripheral face of the lens-barrel 62 is configured similarly to that of the exemplary embodiment above (see FIG. 3).

In this manner, in the present modified example, the lens 12 can be suppressed from tilting while still securing an ease of assembly similar to that of the exemplary embodiment above, even though this is a case in which the second inner peripheral face 62A is configured by the curved faces 62AS instead of by flat faces.

Fifth Modified Example

Figure 8:
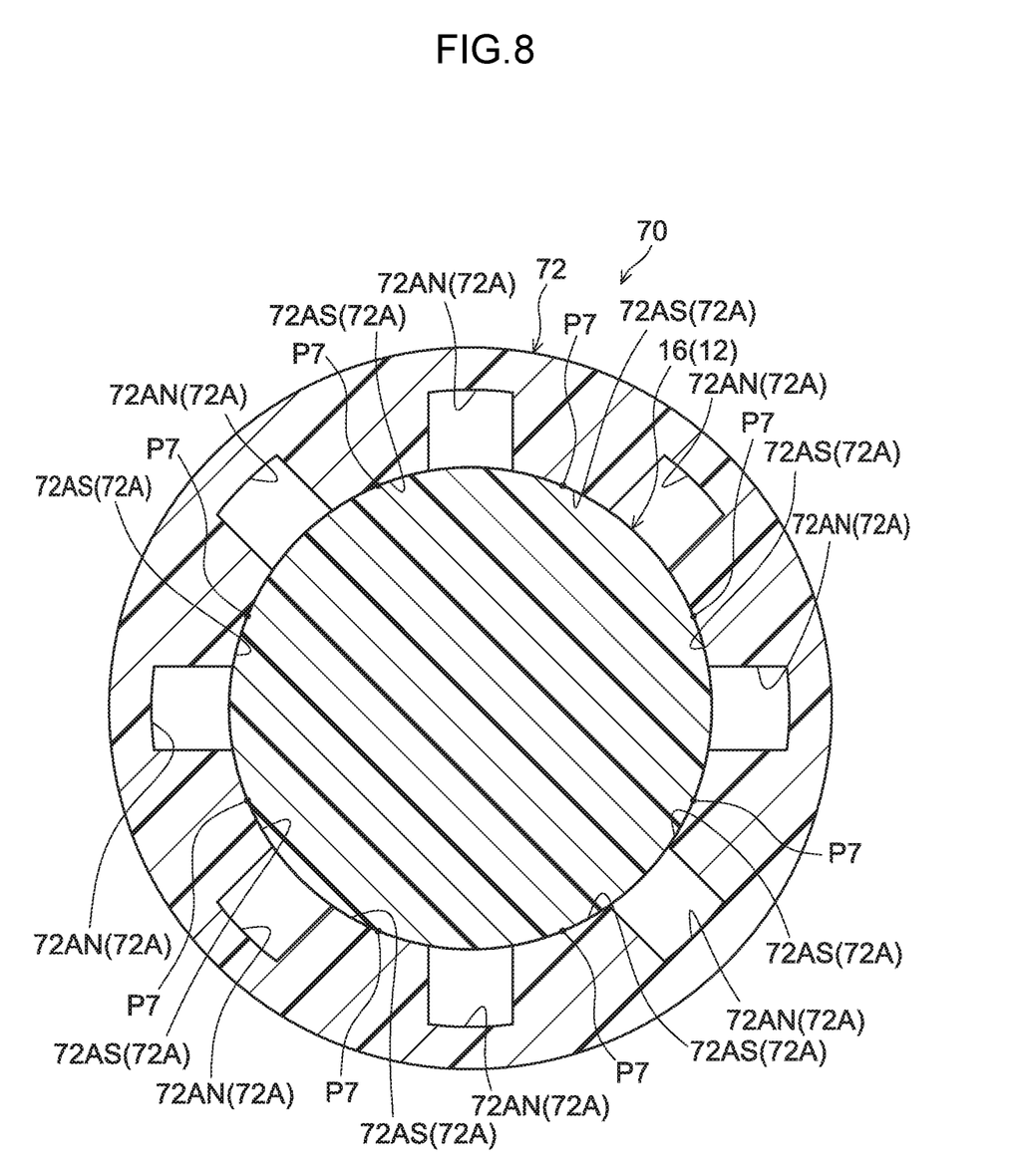
FIG. 8 is a cross-section corresponding to FIG. 2 and illustrating a fifth modified example of a lens unit according to an exemplary embodiment.

Next, as illustrated in FIG. 8, in a fifth modified example a second inner peripheral face 72A of a lens-barrel 72 configuring a lens unit 70 is configured including eight curved faces 72AS, and indentation portions 72AN connecting adjacent of the curved faces 72AS together. Further, the curved faces 72AS are respectively provided at an even spacings around the circumferential direction, are depressed toward the radial direction outside of the lens-barrel 72 and make face-to-face contact with the second circular shaped portion 16. Furthermore, the respective curved faces 72AS fit together with the second circular shaped portion 16 of the lens 12, and contact portions P7 are configured at locations (faces) where the curved faces 72AS and the second circular shaped portion 16 contact each other.

The indentation portions 72AN are formed by hollowing locations between adjacent flat faces toward the radial direction outside. Further, the first inner peripheral face of the lens-barrel 62 is configured similarly to that of the exemplary embodiment above (see FIG. 3). In the present modified example, the lens 12 can be suppressed from tilting while still securing an ease of assembly similar to that of the exemplary embodiment above. Moreover, in the present modified example, due to the second circular shaped portion 16 being received by curved faces, the contact surface area with the second inner peripheral face 72A can be made larger compared to configurations in which the second circular shaped portion 16 is received at points. As a result, in the present modified example, the overall optical axis direction of the lens 12 can be suppressed from tilting.

OTHER EXAMPLES

Although the present disclosure has been described using the above exemplary embodiment and modified examples, the present disclosure is not limited to the above exemplary embodiment and modified examples, and various modifications may be made thereto in a range not departing from the spirit of the present disclosure. For example, although in the above exemplary embodiment the first inner peripheral face 20A of the lens-barrel 18 is formed with a polygonal profile (substantially square shaped profile) when viewed from the optical axis direction, as illustrated in FIG. 3, there is no limitation thereto. The first inner peripheral face 20A may be formed with a substantially circular shaped profile when viewed from the optical axis direction.

Moreover, although in the above exemplary embodiment the second inner peripheral face 22A of the lens-barrel 18 is formed with a substantially regular hexagonal shaped profile when viewed from the optical axis direction, as illustrated in FIG. 2, there is no limitation thereto. The second inner peripheral face 22A may have any profile that the second circular shaped portion 16 will fit together with at three or more locations in the circumferential direction. For example, the second inner peripheral face 22A may be formed with a substantially square shaped profile when viewed from the optical axis direction, to give a structure in which the second circular shaped portion 16 is fitted together therewith at four locations.

Furthermore, although in the above exemplary embodiment the first circular shaped portion 14 and the first inner peripheral face 20A are positioned further toward the object side than the second circular shaped portion 16 and the second inner peripheral face 22A, as illustrated in FIG. 1, there is no limitation thereto. The first circular shaped portion 14 and the first inner peripheral face 20A may be disposed further toward the imaging side than the second circular shaped portion 16 and the second inner peripheral face 22A.

The entire disclosure of Japanese Patent Application No. 2016-065656 is incorporated by reference in the present specification.

All publications, patent applications and technical standards mentioned in the present specification are incorporated by reference in the present specification to the same extent as if each individual publication, patent application, or technical standard was specifically and individually indicated to be incorporated by reference.

The invention claimed is:

1. A lens unit comprising:
   a lens including a first circular shaped portion and a second circular shaped portion arranged in a row along an optical axis direction, the first circular shaped portion including a face that curves with a convex profile in an optical axis direction and the second circular shaped portion including a face that curves with a convex profile in an opposite optical axis direction from the first circular shaped portion;
   a lens-barrel formed of a resin and formed in a tubular shape, the lens-barrel including:
      a first inner peripheral face to which the first circular shaped portion is fitted, and
      a second inner peripheral face to which the second circular shaped portion is fitted and which is positioned separated in the optical axis direction from a fitting section where the first circular shaped portion and the first inner peripheral face are fitted, wherein the second inner peripheral face contacts with a circumferential edge of the second circular shaped portion at three or more portions in a circumferential direction; and
   a spacing ring formed in a ring shape and that holds the lens by contacting the face of the second circular shaped portion.

2. The lens unit of claim 1, wherein:
   the second inner peripheral face is formed with a polygonal profile when viewed from the optical axis direction; and
   contact portions at the second inner peripheral face that contacts with the second circular shaped portion have flat faces that forms each side of the polygonal profile.

3. The lens unit of claim 2, wherein the second inner peripheral face includes curved faces formed to link adjacent of the flat faces together.

4. The lens unit of claim 2, wherein the first circular shaped portion and the first inner peripheral face contact each other at three or more portions in a circumferential direction.

5. The lens unit of claim 4, wherein the first inner peripheral face has a polygonal profile when viewed from the optical axis direction.

6. The lens unit of claim 5, wherein the first inner peripheral face is configured including flat faces forming each side of the polygonal profile, and circular arc shaped connection portions connecting adjacent of the flat faces together.

7. The lens unit of claim 5, wherein:
   the first inner peripheral face is positioned further to a radial direction outside than the second inner peripheral face; and
   flat faces forming each side of the first inner peripheral face and flat faces forming each side of the second inner peripheral face are formed at the same circumferential direction positions with each other, when viewed from the optical axis direction.

8. The lens unit of claim 1, wherein a curved face is formed at a contact portion at the second inner peripheral face where contact is made with the second circular shaped portion, the curved face being depressed toward a radial direction outside of the lens-barrel when viewed from the optical axis direction and making face-to-face contact with the second circular shaped portion.

9. The lens unit of claim 1, wherein the first inner peripheral face is positioned further to a radial direction outside than the second inner peripheral face.

10. The lens unit of claim 9, wherein a length of the first circular shaped portion in the optical axis direction is shorter than a length of the second circular shaped portion in the optical axis direction.

11. The lens unit of claim 1, wherein:
    at least one of the first inner peripheral face or the second inner peripheral face includes an inclined face inclined with respect to the optical axis direction; and
    of the first circular shaped portion or the second circular shaped portion, a circular shaped portion that fits together with the inclined face is inclined to correspond to the inclined face.

12. The lens unit of claim 1, wherein the lens unit is a lens unit employed onboard a vehicle or employed for surveillance.

* * * * *